United States Patent [19]

Belleau et al.

[11] Patent Number: 4,695,342
[45] Date of Patent: Sep. 22, 1987

[54] METHOD OF FORMING TRUCK CAB FRAMES

[75] Inventors: Gordon F. Belleau, Algonac; Michael J. Jelcin, Rochester; Charles F. Verga, Holly, all of Mich.

[73] Assignee: General Motors Corporation, Detroit, Mich.

[21] Appl. No.: 717,313

[22] Filed: Mar. 28, 1985

[51] Int. Cl.⁴ .................................... B65H 81/00
[52] U.S. Cl. ................... 156/173; 296/31 P; 296/203
[58] Field of Search ............. 156/166, 169, 172, 173, 156/175, 174, 425, 441, 433; 296/187, 203, 29, 31 P, 31 R; 52/309.16

[56] References Cited

U.S. PATENT DOCUMENTS

| | | | |
|---|---|---|---|
| 3,551,237 | 12/1970 | Cox et al. | 156/175 |
| 3,615,983 | 10/1971 | Palfreyman et al. | 156/175 |
| 3,740,285 | 6/1973 | Goldsworthy et al. | 156/173 |
| 4,137,354 | 1/1979 | Mayes et al. | 156/175 |

FOREIGN PATENT DOCUMENTS

| | | |
|---|---|---|
| 1414462 | 11/1975 | United Kingdom . |
| 1524896 | 9/1978 | United Kingdom . |
| 2004835 | 4/1979 | United Kingdom . |
| 2049613 | 12/1980 | United Kingdom . |

Primary Examiner—Michael Ball
Attorney, Agent, or Firm—C. K. Veenstra

[57] ABSTRACT

To form a pair of truck cab frames, a pair of mandrels are provided in base-to-base relationship, filamentary material is wound about the mandrels to form four corner pillars, four roof rails and two roof cross-members of each frame, and the corner pillars of one frame are separated from the corner pillars of the other frame adjacent the bases of the mandrels.

1 Claim, 15 Drawing Figures

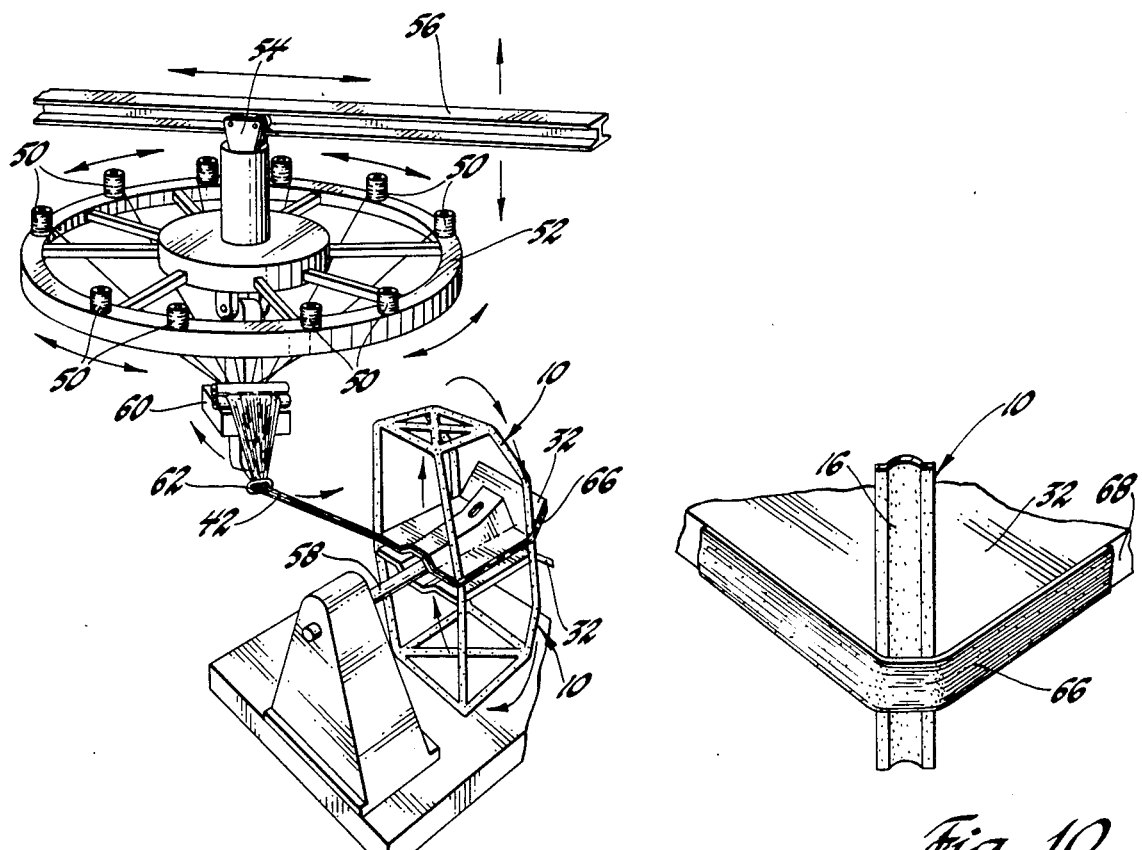
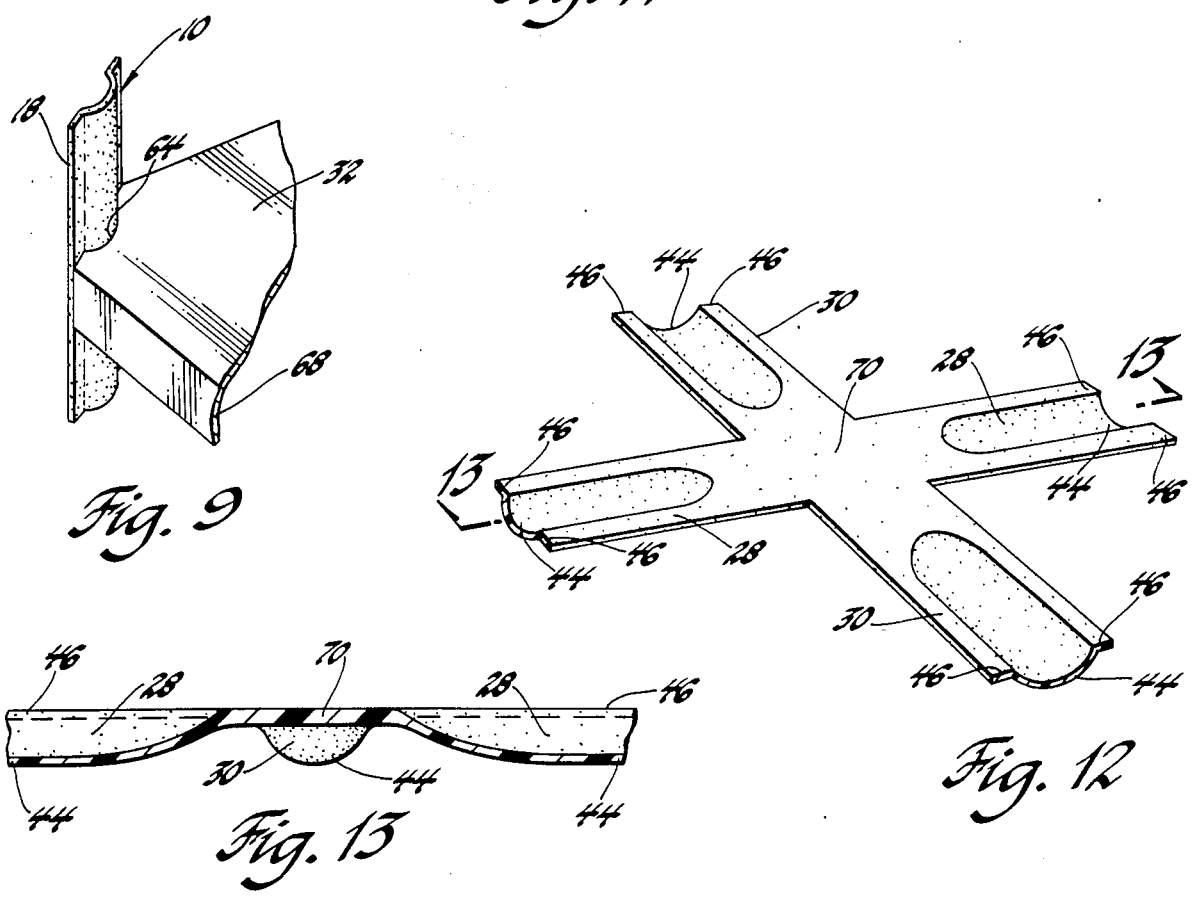

METHOD OF FORMING TRUCK CAB FRAMES

TECHNICAL FIELD

This invention relates to a method of forming a pair of filament wound truck cab frames.

BACKGROUND

The technology for forming structures from windings of filamentary material has been applied to a variety of products. To form a filament wound product, fibers of either thread-like or ribbon-like filamentary material impregnated with a resin are wound about a mandrel and cured to create a product having a strong lightweight structure.

SUMMARY OF THE INVENTION

This invention provides a method of employing the filament winding technology to form a pair of truck cab frames.

In accordance with this invention, a pair of truck cab frames are formed by providing a pair of mandrels in base-to-base relationship, winding filamentary material about the mandrel to form four corner pillars, four roof rails and two roof cross-members of each frame, and separating the corner pillars of one frame from the corner pillars of the other frame adjacent the bases of the mandrels.

The details as well as other features and advantages of two embodiments of this invention are set forth in the remainder of the specification and are shown in the accompanying drawings.

SUMMARY OF THE DRAWINGS

FIG. 9 is a schematic view of the intersection of a corner pillar of the truck cab frame and an underbody unit, before the frame is secured to the underbody unit.

FIG. 10 is a schematic view of the intersection of a corner pillar of the truck cab frame and an underbody unit, after the frame is secured to the underbody unit.

FIG. 11 is a schematic view of the filament winding machine as it secures the truck cab frames to the underbody units.

FIG. 12 is an enlarged view of the roof cross-members of the truck cab frame.

FIG. 13 is a sectional view taken along line 11—11 of FIG. 10, showing details of the intersection of the roof cross-members.

THE PREFERRED EMBODIMENTS

Figure 1:
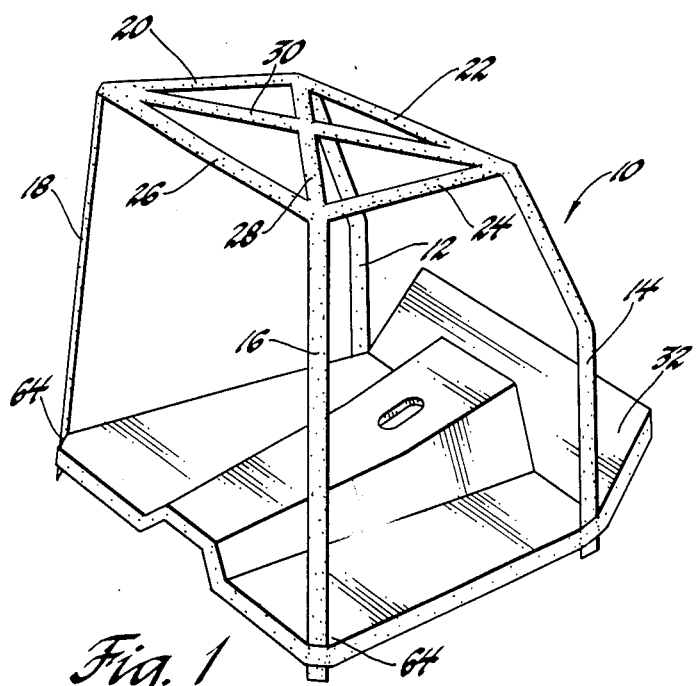
FIG. 1 is a schematic view of a filament wound truck cab frame formed according to this invention and assembled with an underbody unit.
Figure 2:
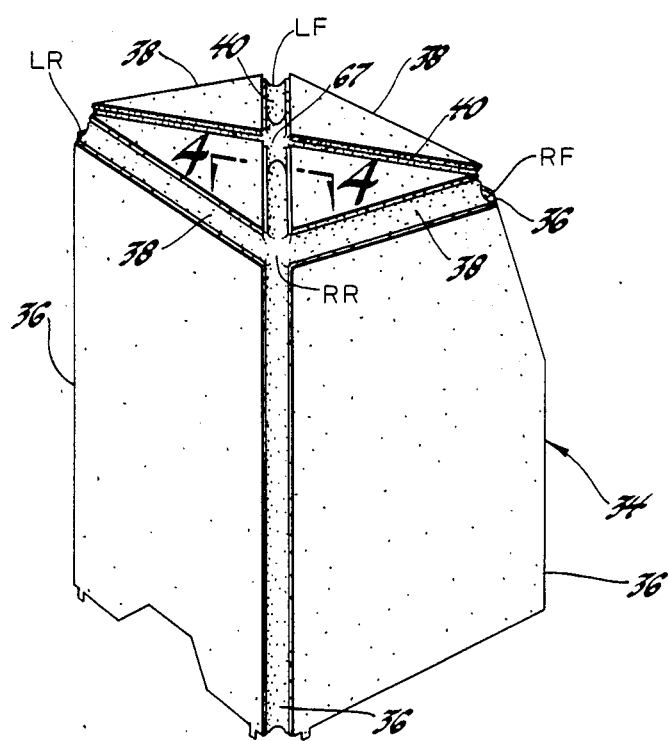
FIG. 2 is a view of a mandrel for forming the filament wound truck cab frame of FIG. 1.

Referring first to FIG. 1, a truck cab frame 10 formed according to this invention has four corner pillars 12, 14, 16 and 18, four roof rails 20, 22, 24 and 26, and two roof cross-members 28 and 30. Each of the corner pillars is secured to an underbody unit 32. Frame 10 is formed by winding filamentary material about a mandrel such as the one-piece mandrel 34 shown in FIG. 2.

Mandrel 34 has four corner pillar channels 36 along its vertical edges to form the four corner pillars, four roof rail channels 38 about its top to form the four roof rails, and two diagonal overlapping cross channels 40 across its top to form the two roof cross-members. At the top left front corner LF, right front corner RF, right rear corner RR and left rear corner LR of mandrel 34, each of the corner pillar channels 36 intersects a cross channel 40 and two roof rail channels 38.

Figure 3:
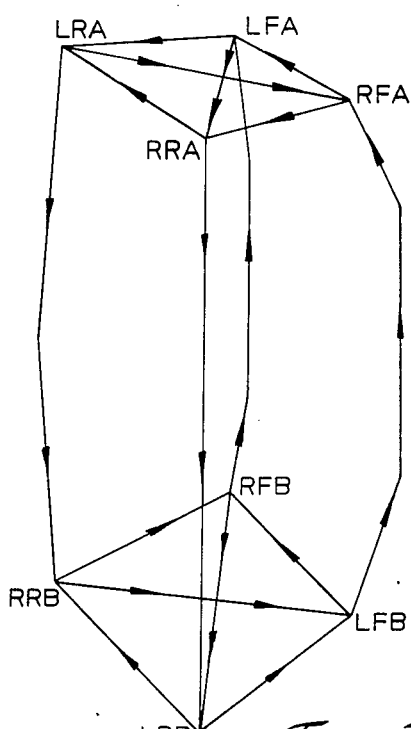
FIG. 3 illustrates a preferred sequence for winding filamentary material about a pair of mandrels, aligned in base-to-base relationship, to form a pair of truck cab frames.

To form a pair of truck cab frames 10, a pair of mandrels such as 34 are placed in base-to-base relation. The corner pillar channels of each mandrel are aligned with the corner pillar channels of the other mandrel, and as shown in FIG. 3, the corners where the channels of one mandrel intersect are designated LFA, RFA, RRA and LRA and the corners where the channels of the other mandrel intersect are designated LFB, RFB, RRB and LRB—RRB being aligned with LRA, LRB being aligned with RRA, LFB being aligned with RFA, and RFB being aligned with LFA. Filamentary material such as resin impregnated continuous glass fiber is then wound about the mandrels, and a preferred sequence for winding the filamentary material repeatedly follows the pattern RRB, LFB, RFB, LRB, LFB, RFA, LFA, RRA, LRA, RRB, RFB, LFA, LRA, RFA, RRA, LRB, RRB until the four corner pillars, four roof rails, and two roof cross-members of each frame have been formed. After the filamentary material has been cured, the corner pillars of one frame are separated from the corner pillars of the other frame adjacent the bases of the mandrels, and the mandrels are removed from the frames. Each frame 10 is then secured to an underbody unit 32.

Figure 4:
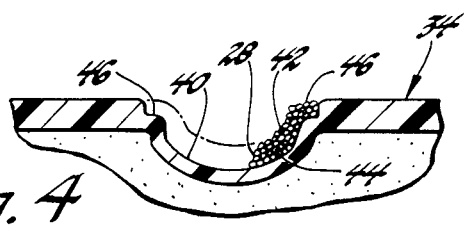
FIG. 4 is a sectional view taken along line 4—4 of FIG. 2, illustrating details of the mandrel construction.

As represented by the sectional view of a mandrel cross channel 40 and its roof cross-member 28 shown in FIG. 4, each of the channels 36, 38 and 40 has a curvilinear configuration, and the filamentary material 42 is wound into the channels to create corner pillars 12, 14, 16 and 18, roof rails 20, 22, 24 and 26, and roof cross-members 28 and 30 with a curvilinear region 44 connecting a pair of flange regions 46.

Figure 5:
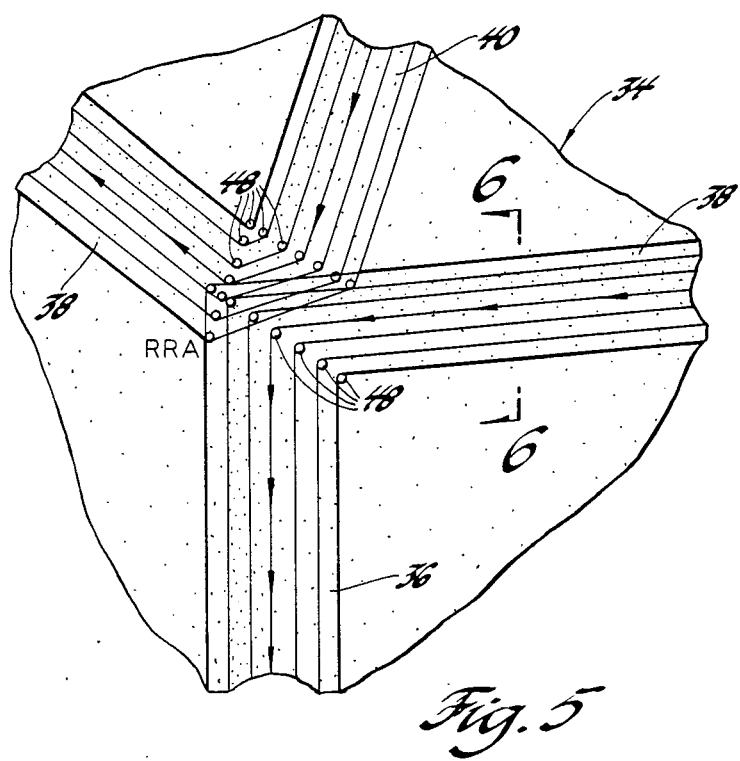
FIG. 5 is an enlarged view of a corner of the mandrel, schematically illustrating retractable pins which aid in positioning the filamentary material at the corner.
Figure 6:
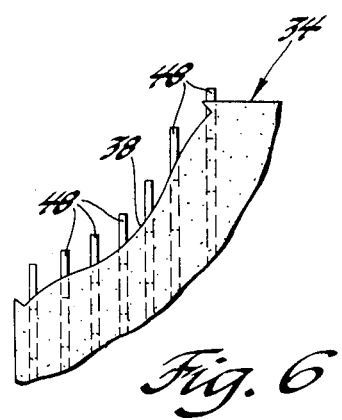
FIG. 6 is a view in the direction indicated by the line 6—6 of FIG. 5, further schematically illustrating some of the retractable pins.

Retractable pins 48, shown in FIGS. 5 and 6, may be employed at the mandrel corners to guide the filamentary material and hold it in place with the desired tension as it is wound about the mandrels.

Figure 7:
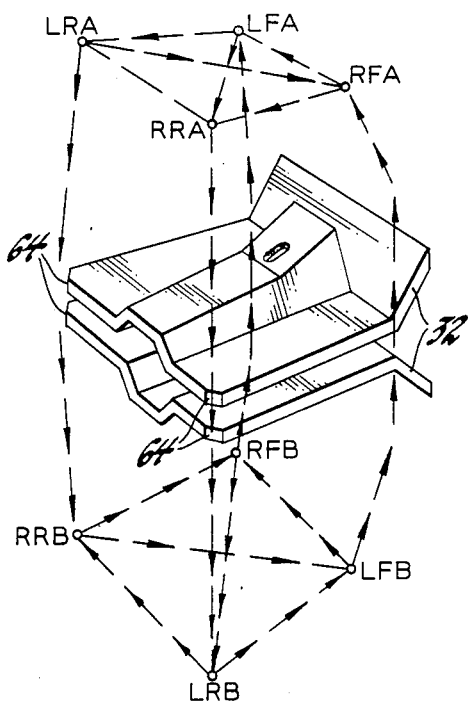
FIG. 7 is a view similar to FIG. 3, illustrating a preferred sequence for winding filamentary material about a pair of mandrels each of which includes an underbody unit so a pair of truck cab frame and underbody assemblies are formed in one operation.

It will be appreciated, of course, that for some applications it could be desirable to wind the filamentary material about mandrels that include underbody units 32 so a pair of truck cab frame and underbody assemblies is created in one operation. Such may be accomplished by employing multi-piece mandrels, and it may also be possible to accomplish such by employing inflatable mandrels. In either of these instances, a pair of mandrels with their included underbody units are placed in base-to-base relation and filamentary material is repeatedly wound about the mandrels-underbodies according to the preferred sequence described above as shown in FIG. 7 until the four corner pillars, four roof rails, and two roof cross-members of each frame have been formed. After the filamentary material has been cured, the corner pillars of one frame are separated from the corner pillars of the other frame between the underbody units, and the multi-piece or inflatable portions of the mandrels are removed from the frame-underbody assemblies.

Figure 8:
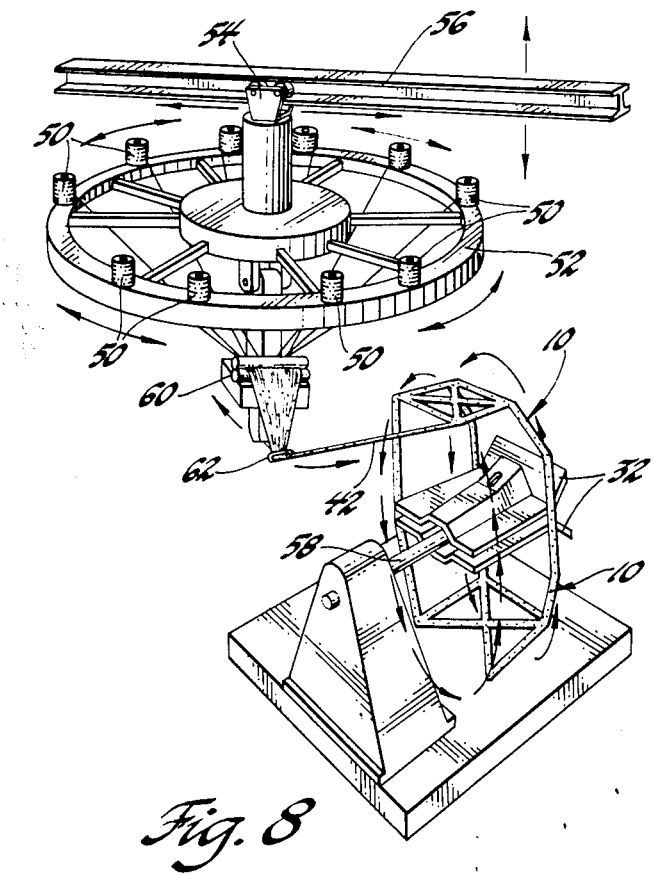
FIG. 8 is a schematic view of a filament winding machine as it forms a pair of truck cab frames.

The machine illustrated in FIG. 8 may be employed to wind the filamentary material. It has a plurality of creels 50 carried on a wheel 52. Wheel 52 is suspended from a carriage 54 guided by a horizontal track 56, and track 56 is supported for vertical movement. The mandrels with their included underbody units are mounted on an axle 58. Rotation of axle 58 and of wheel 52, horizontal movement of carriage 54, and vertical movement of track 56 will combine to pull filamentary material 42 from creels 50 through resin bath 60 and forming band 62 and wind it about the mandrels with the desired tension to form frames 10.

The corners 64 on underbody unit 32 are recessed as shown in FIG. 9 to conform to the configuration of the corner rails 12, 14, 16 and 18, and as further shown in FIG. 10, a band 66 is wound about the corner rails and about a flange 68 depending from underbody unit 32 to secure the corner rails to underbody unit 32.

As shown in FIG. 11, the filament winding machine illustrated in FIG. 8 also may be employed to wind the bands 66 which secure frames 10 to underbody units 32.

As mentioned above, roof cross-members 28 and 30 generally have a region 44 of curvilinear configuration which connects flange regions 46. However, at the intersection 67 of the mandrel cross channels 40, the channels have a flat configuration and create flat upper and lower surfaces 70 of roof cross-members 28 and 30 as shown in FIGS. 12 and 13.

Figure 14:
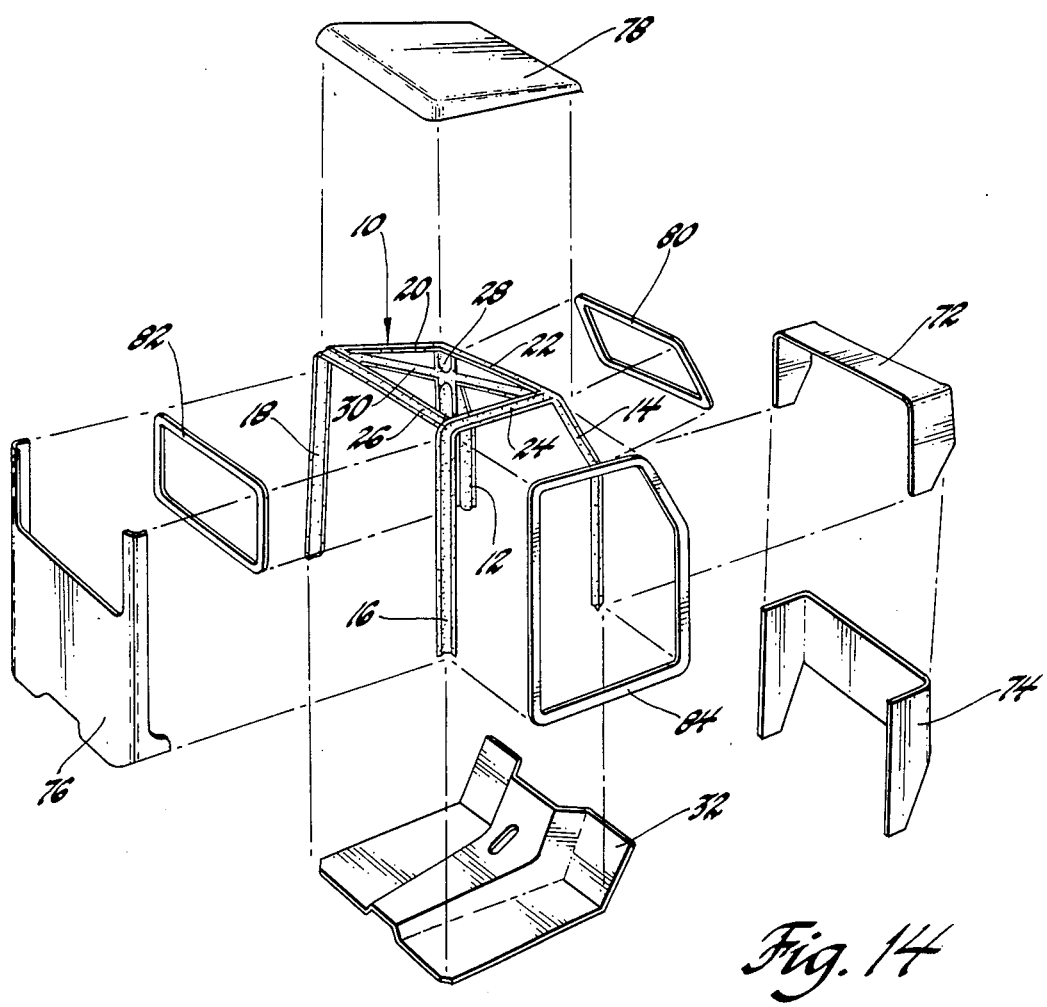
FIG. 14 is a schematic exploded view of an assembly of a filament wound truck cab frame and an underbody unit, together with various body panels, front and rear glass frames, and a door frame.
Figure 15:
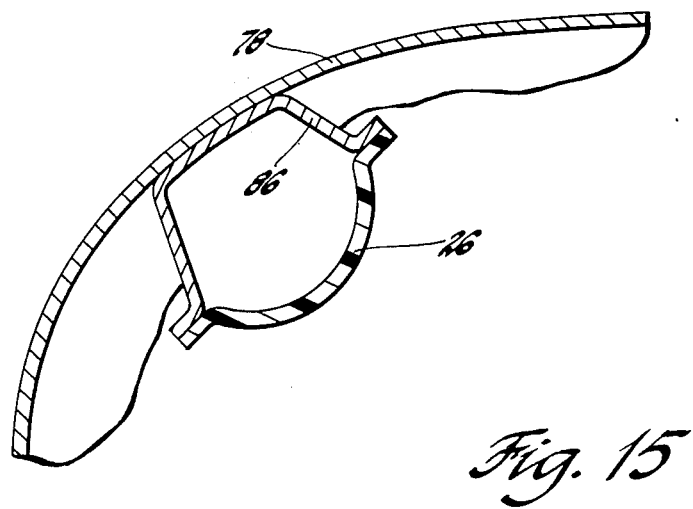
FIG. 15 is a schematic sectional view showing a roof support secured to a roof rail of the filament wound truck cab frame, and a roof panel secured to the roof support.

Referring to FIGS. 14 and 15, frame 10 and underbody unit 32 are assembled with various body panels 72, 74, 76 and 78, front and rear glass frames 80 and 82, and door frames 84 to form a complete truck cab. To secure roof panel 78 to frame 10, for example, roof supports 86 are secured to roof rails 20, 22, 24 and 26 and roof panel 78 is secured to roof supports 86.

The embodiments of the invention in which an exclusive property or privilege is claimed are defined as follows:

1. The method of forming a pair of truck cab frames comprising the steps of:

providing a pair of mandrels in base-to-base relationship, each mandrel having four corner pillar channels for forming four corner pillars, the corner pillar channels of one mandrel being aligned with the corner pillar channels of the other mandrel, each mandrel further having four roof rail channels for forming four roof rails, each mandrel also having two cross channels for forming two roof cross-members, the cross channels overlapping and having a flat surface in the overlapping region, the cross channels having a curvilinear surface in the remaining regions, the corner pillar channels and the roof rail channels also having a curvilinear surface, each corner pillar channel of each mandrel intersecting a cross channel and two roof rail channels of that mandrel, the intersections on one mandrel being designated LRA, RRA, RFA and LFA in a counterclockwise direction, the intersections on the other mandrel being designated RRB, LRB, LFB and RFB, RRB being aligned with LRA, LRB being aligned with RRA, LFB being aligned with RFA, and RFB being aligned with LFA, winding filamentary material about said mandrels in the pattern RRB, LFB, RFB, LRB, LFB, RFA, LFA, RRA, LRA, RRB, RFB, LFA, LRA, RFA, RRA, LRB, RRB to form four corner pillars, four roof rails, and two roof cross-members of each frame, and separating the corner pillars of one frame from the corner pillars of the other frame adjacent the bases of said mandrels.

* * * * *